United States Patent [19]
Kurokawa et al.

[11] Patent Number: 5,081,962
[45] Date of Patent: Jan. 21, 1992

[54] FUEL INTAKE SYSTEM FOR V-TYPE COMBUSTION ENGINE

[75] Inventors: Toshikazu Kurokawa; Fusatoshi Tanaka; Kouji Matsuura; Motoi Aoki, all of Hiroshima, Japan

[73] Assignee: Mazda Motor Corporation, Hiroshima, Japan

[21] Appl. No.: 677,566

[22] Filed: Mar. 29, 1991

[30] Foreign Application Priority Data

Mar. 31, 1990 [JP] Japan .................................. 2-85810
Nov. 30, 1990 [JP] Japan ................................ 2-334056

[51] Int. Cl.⁵ ............................................ F02M 35/10
[52] U.S. Cl. ......................... 123/52 MV; 123/52 MB
[58] Field of Search ........ 123/52 M, 52 MV, 52 MC, 123/52 MB, 52 MF, 52 ML

[56] References Cited

U.S. PATENT DOCUMENTS

| | | | |
|---|---|---|---|
| 2,916,027 | 12/1959 | Chayne et al. | 123/52 MV |
| 4,641,610 | 2/1987 | Rutschmann | 123/52 MV |
| 4,803,961 | 2/1989 | Hiraoka et al. | 123/52 MV |
| 4,811,697 | 3/1989 | Kurahashi et al. | 123/52 MV |
| 4,829,941 | 5/1989 | Hitomi et al. | 123/52 MV |
| 4,977,865 | 12/1990 | Hiraoka et al. | 123/52 MB |
| 5,000,129 | 3/1991 | Fukada et al. | 123/52 MV |
| 5,010,854 | 4/1991 | Suehiro et al. | 123/55 VE |
| 5,027,769 | 7/1991 | Yoshida et al. | 123/403 |

FOREIGN PATENT DOCUMENTS

| | | | |
|---|---|---|---|
| 0148023 | 9/1982 | Japan | 123/52 MB |
| 0116020 | 6/1986 | Japan | 123/52 M |
| 0048922 | 3/1987 | Japan | 123/52 M |
| 0092519 | 4/1989 | Japan | 123/52 M |
| 0123231 | 5/1990 | Japan | 123/52 MB |

Primary Examiner—David A. Okonsky
Attorney, Agent, or Firm—Fish & Richardson

[57] ABSTRACT

A fuel intake system for a combustion engine of a type having V-shaped first and second cylinder banks and also having a crank axis of the crankshaft, which comprises a throttle casing disposed in a center space delimited between the first and second cylinder banks, elongated first and second surge tanks extending in a direction parallel to the crank axis and disposed on respective sides of the center space, and a passage system communicating the throttle casing to each of the first and second surge tanks. The passage system comprises a merging region communicated with the throttle casing and first and second branch ducts branched off from one end of the merging region opposite to the throttle casing. The first and second branch ducts connect to the first and second surge tanks, respectively. Each of the first and second branch ducts is comprised of two independent passages spaced apart from each other in a direction parallel to the crank axis. These two independent passages of each of the first and second branch ducts are communicated with different portions of the associated surge tank which are uniformly spaced from each other in a direction parallel to the crank axis.

23 Claims, 9 Drawing Sheets

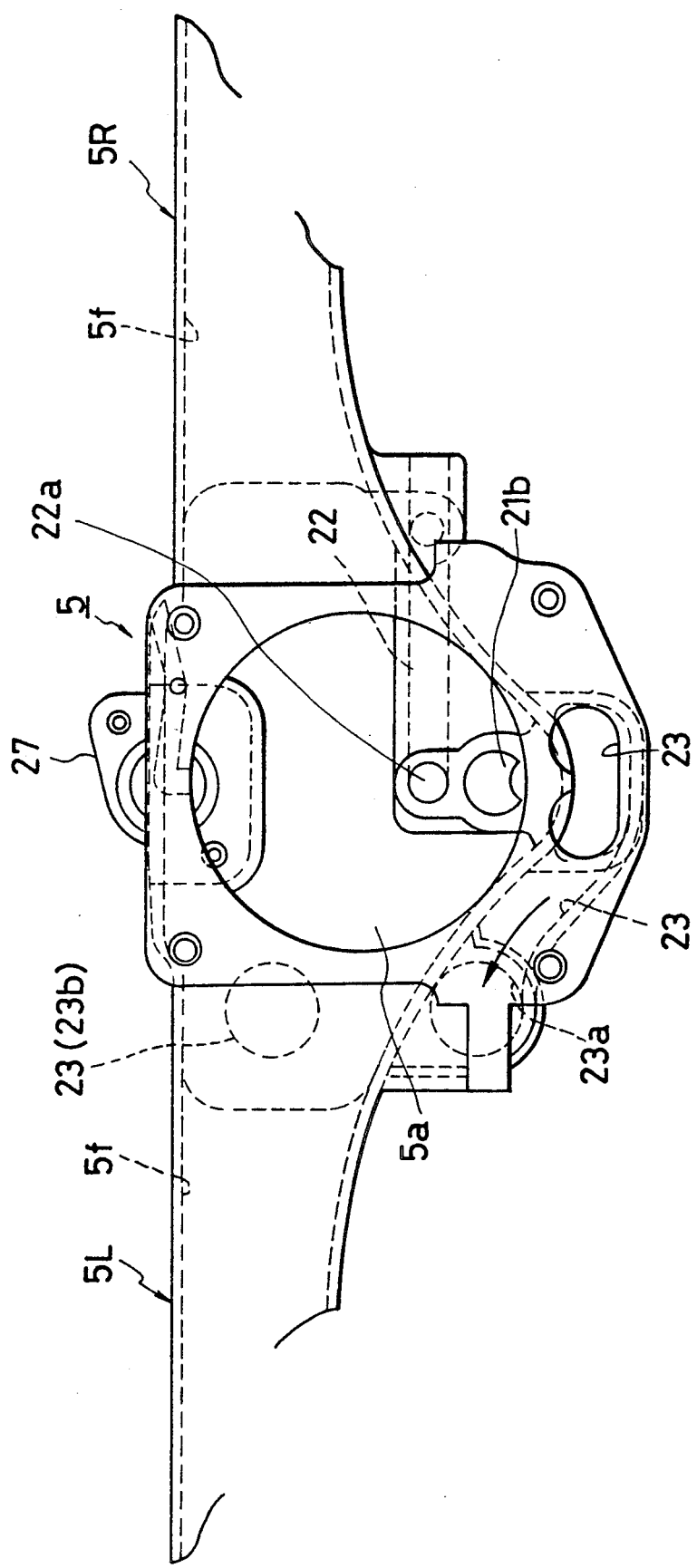

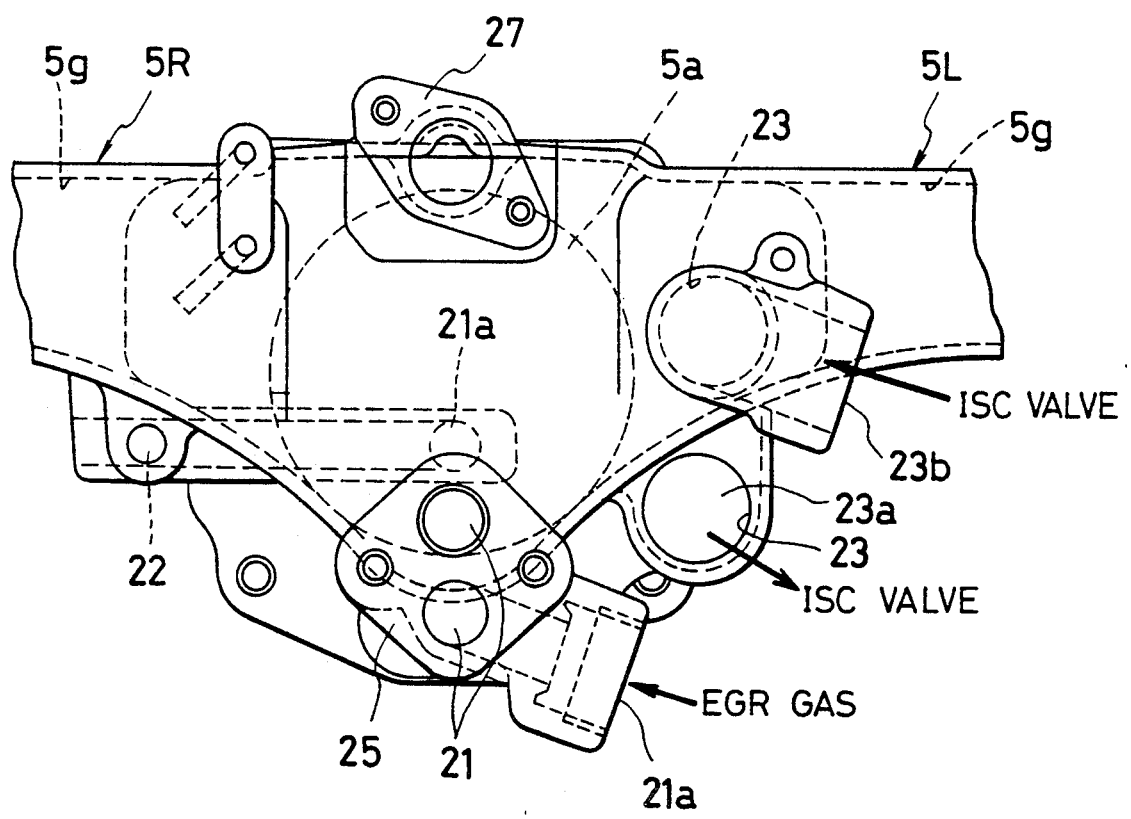

5,081,962

1

FUEL INTAKE SYSTEM FOR V-TYPE COMBUSTION ENGINE

BACKGROUND OF THE INVENTION

1. Field of the Invention

The present invention generally relates to a fuel intake system for a V-type combustion engine of an automotive vehicle and, more particularly, to the automobile fuel intake system employed in a multi-cylinder automobile combustion engine having V-shaped cylinder banks.

2. Description of Related Art

The manufacture of multi-cylinder internal combustion engines is now increasing for use aboard automotive vehicles. This is particularly true of automobile internal combustion engines having 8 to 12 cylinders. This is not an exception to the internal combustion engine of a type having V-shaped cylinder banks such as disclosed in, for example, Japanese Laid-open (kokai) Patent Publication No. 40724/1985.

When it comes to the employment of the multiple cylinders in the internal combustion engine having V-shaped cylinder banks on respective sides of the longitudinal sense of an engine cylinder block, the length of the engine cylinder block tends to have an increased length accompanied by the necessity of use of a crankshaft of correspondingly increased length. The increase in length of the engine cylinder block poses a problem associated with a proper distribution of intake air for each cylinder bank in a direction generally parallel to the crank axis along which the crankshaft extends.

On the other hand, in order to avoid any possible adverse influence which may be brought on a compact feature of the internal combustion engine of the type having V-shaped cylinder banks, it is recommended to install a throttle casing, which is one of relatively bulky component parts of the internal combustion engine, within a generally V-shaped longitudinal center space delimited between the cylinder banks.

SUMMARY OF THE INVENTION

The present invention has been devised in consideration of the foregoing circumstances found in the prior art internal combustion engine of the type having V-shaped cylinder banks and is intended to provide an improved fuel intake system for the internal combustion engine of the type having the V-shaped cylinder banks, wherein the throttle casing is disposed within a generally V-shaped longitudinal center space delimited between the cylinder banks and also wherein a substantially uniform distribution of the intake air is secured in a direction generally parallel to the crank axis.

To this end, the present invention provides a fuel intake system for a combustion engine of a type having generally V-shaped first and second cylinder banks and also having a crank axis along which a crankshaft extends, which comprises a throttle casing disposed in a center space delimited between the first and second cylinder banks, generally elongated first and second surge tanks (4L and 4R) extending in a direction generally parallel to the crank axis and disposed on respective sides of the center space, and a passage means communicating the throttle casing to each of the first and second surge tanks.

The passage means referred to above comprises a merging region communicated with the throttle casing and first and second branch ducts branched off from one end of the merging region opposite to the throttle casing. The first and second branch ducts connect to the first and second surge tanks, respectively.

Each of the first and second branch ducts is comprised of two independent passages spaced apart from each other in a direction parallel to the crank axis. These two independent passages of each of the first and second branch ducts are communicated with different portions of the associated surge tank which are uniformly spaced from each other in a direction parallel to the crank axis.

Thus, according to the present invention, the throttle casing is disposed above the engine cylinder block and within the V-shaped longitudinal space delimited between the cylinder banks. Therefore, this disposition of the throttle casing will not adversely affect the compact feature of the internal combustion engine of the type having the V-shaped cylinder banks.

Also, a passage means extending from the throttle casing to each of the surge tanks associated respectively with the cylinder banks is comprised of two groups of passages for each bank and the passages of those two groups are communicated with different portions of the associated surge tank which are spaced a uniform distance from each other in a direction parallel to the crank axis. Therefore, even though the internal combustion engine of the type having the V-shaped cylinder banks are so designed to have an increased number of combustion cylinders for each bank, it is possible to secure the uniform distribution in each of the banks of intake air in a direction parallel to the crank axis.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the accompanying drawings, like reference numerals are used to denote like parts throughout the several views.

FIG. 8 is an elevational view showing the merging region of the upstream passage employed in the combustion engine of FIG. 4; and FIG. 9 is a fragmentary elevational view of the merging region of the upstream passage in the combustion engine of FIG. 4 as viewed from rear of the automotive vehicle.

DESCRIPTION OF THE PREFERRED EMBODIMENTS

In describing some preferred embodiments of the present invention, reference will be made to an 12-cylinder automobile internal combustion engine of a type comprising a cylinder block having two cylinder banks in a V-shaped configuration with in-line six cylinders in each bank.

Figure 1:
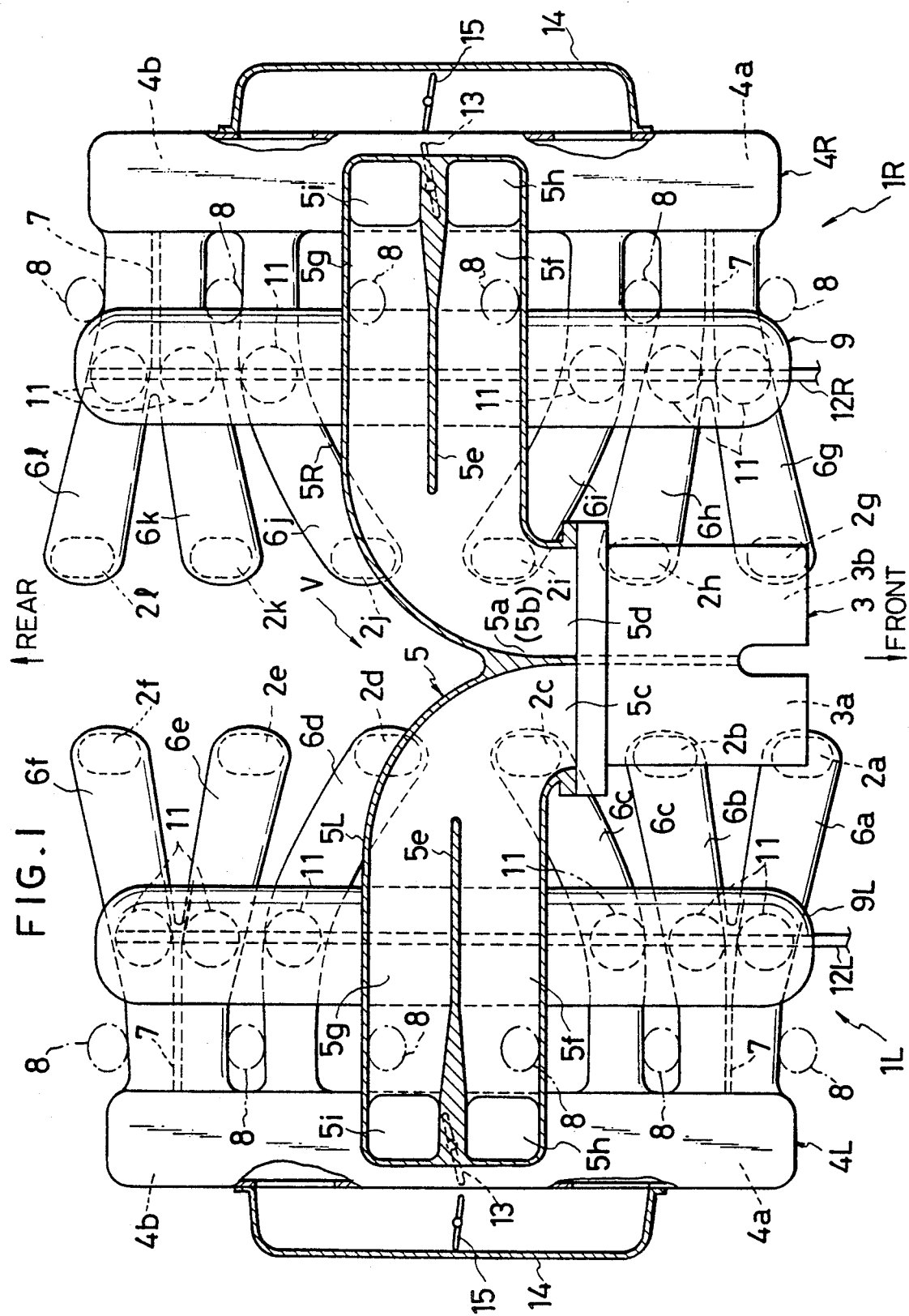
FIG. 1 is a top plan view of a V-type combustion engine for use in an automotive vehicle according to a first preferred embodiment of the present invention.
Figure 2:
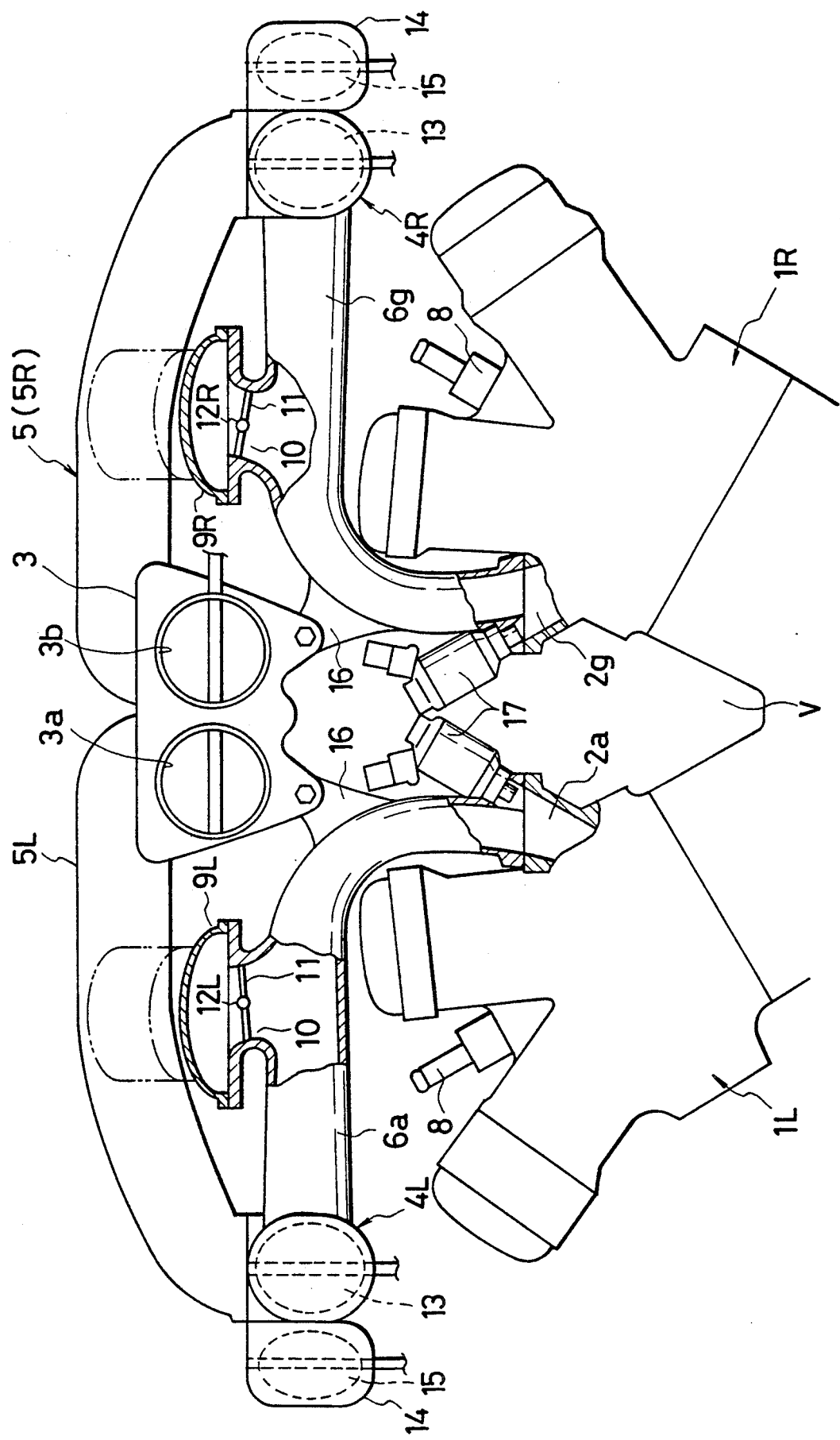
FIG. 2 is a front elevational view, with a portion cut away, of the V-type combustion engine of FIG. 1 as viewed from front of an automotive vehicle.

Referring first to FIGS. 1 and 2 showing the first preferred embodiment of the present invention, an engine cylinder block is shown to have left-hand and right-hand cylinder banks 1L and 1R extending parallel to each other on respective side of a longitudinal sense of the engine cylinder block. Each of those left-hand and right-hand cylinder banks has six in-line combustion chambers defined therein and having respective intake ports. The intake ports communicated with the combustion chambers in the left-hand cylinder bank are identified by 2a, 2b, 2c, 2d, 2e and 2f, respectively, while the intake ports communicated with the combustion chambers in the right-hand cylinder bank are identified by 2g, 2h, 2j, 2k and 2l, respectively.

The engine cylinder block has a throttle casing 3 mounted thereon and positioned between the left-hand and right-hand cylinder banks 1L and 1R and adjacent a front end of the engine cylinder block with respect to the direction of forward run of the automotive vehicle (or a lower portion of the drawing of FIG. 1). The throttle casing 3 has a hollow divided by a partition wall so as to define left-hand and right-hand throttle passages 3a and 3b in association with the left-hand and right-hand cylinder banks 1L and 1R, respectively, and includes throttle valves operatively disposed in the left-hand and right-hand throttle passages 3a and 3b, respectively.

Positioned upward of the left-hand and right-hand cylinder banks 1L and 1R and on respective sides of a generally V-shaped longitudinal center space V delimited between the left-hand and right-hand cylinder banks 1L and 1R are generally elongated left-hand and right-hand surge tanks 4L and 4R, respectively, each of said surge tanks 4L and 4R extending in a direction generally parallel to a crank axis along which a crankshaft extends, or the longitudinal sense of the engine cylinder block. The surge tanks 4L and 4R are communicated with the throttle passages 3a and 3b in the throttle casing 3 through an upstream intake manifold 5 as will be described subsequently in detail.

The upstream intake manifold 5 comprises a merging region 5a extending a small distance from a rear end of the throttle casing 3 in a direction parallel to the crank axis referred to above, and a pair of branch ducts 5L and 5R branched off from the merging region 5a so as to extend towards the left-hand and right-hand surge tanks 4L and 4R, respectively. The merging region 5a is of a design progressively increasing in elevation so as to incline upwards in a direction close towards the rear of an automobile body structure at an angle of inclination generally conforming to the angle of inclination of a hingedly supported bonnet or hood adapted to selectively close and open an access opening leading to an engine room in the automobile body structure. An open end of the left-hand branch duct 5L remote from the throttle casing 3 is fluid-connected with that portion of an upper wall of the left-hand surge tank 4L which is generally intermediate of the length of such left-hand surge tank 4L, whereas an open end of the right-hand branch duct 5R remote from the throttle casing 3 is fluid-connected with that portion of an upper wall of the right-hand surge tank 4R which is generally intermediate of the length of such right-hand surge tank 4R. Respective connections between the branch ducts 5L and 5R and those intermediate portions of the upper walls of the surge tanks 4L and 4R are generally identified by 5h and 5i in FIG. 1.

The merging region 5a of the upstream intake manifold 5 has a partition wall 5b dividing the interior thereof into left-hand and right-hand passages 5c and 5d which are in communication with the left-hand and right-hand throttle passages 3a and 3b defined within the throttle casing 3, respectively. Similarly, each of the branch ducts 5L and 5R has its hollow divided into two passages 5f and 5g by means of a partition wall 5e extending from one end of the respective branch duct 5L and 5R adjacent the associated surge tank 3L and 3R and terminating adjacent the merging region 5a.

The left-hand surge tank 4L and the fuel intake ports 2a, 2b, 2c, 2d, 2e and 2f in the left-hand cylinder bank 1L are communicated with each other through individual intake passages 6a, 6b, 6c, 6d, 6e and 6f which extend from a side wall of the left-hand surge tank 4L confronting the longitudinal center space V to the respective fuel intake ports 2a to 2f, having passed underneath the upstream intake manifold 5, specifically the left-hand fuel intake duct 5L. Similarly, the right-hand surge tank 4R and the fuel intake ports 2g to 2l in the right-hand cylinder bank 1R are communicated with each other through individual intake passages 6g, 6h, 6i, 6j, 6k and 6l which extend from a side wall of the right-hand surge tank 4R confronting the longitudinal center space V to the respective fuel intake ports 2a to 2l, having passed underneath the upstream intake manifold 5, specifically the right-hand fuel intake duct 5R.

Two of the individual intake passages 6a to 6f which are positioned adjacent the left-hand fuel intake duct 5L, that is, the intake passages 6c and 6d, are in practice defined in a single suction piping independent of the associated surge tank 4L, while two of the individual intake passages 6g to 6l which are positioned adjacent the right-hand fuel intake duct 5R, that is, the individual intake passages 6i and 6j, are similarly defined in a single suction piping independent of the associated surge tank 4R. On the other hand, the remaining four intake passages 6a, 6b, 6e and 6f positioned remote from the associated left-hand fuel intake duct 5L have their end portions adjacent the associated surge tank 4L which are defined in a common suction piping, while the remaining four intake passages 6g, 6h, 6k and 6l positioned remote from the associated right-hand fuel intake duct 5R have their end portions adjacent the associated surge tank 4R which are defined in a common suction piping.

In other words, the intake passages 6a and 6b are in practice defined in a generally Y-shaped piping which comprises a common piping portion adjacent the surge tank 4L and divided by a partition wall 7 into two passage portions which form respective parts of the intake passages 6a and 6b. Similarly, the intake passage 6d and 6e are in practice defined in a generally Y-shaped piping which comprises a common piping portion adjacent the surge tank 4L and divided by a partition wall 7 into two passage portions which form respective parts of the intake passages 6d and 6e. The intake passages 6g and 6h are in practice defined in a generally Y-shaped piping which comprises a common piping portion adjacent the surge tank 4R and divided by a partition wall 7 into two passage portions which form respective parts of the intake passages 6g and 6h. Finally, the intake passages 6j and 6k are in practice defined in a generally Y-shaped piping which comprises a common piping portion adjacent the surge tank 4R and divided by a partition wall 7 into two passage portions which form respective parts of the intake passages 6j and 6k. By the employment of this design, an access to ignition plugs 8 associated with the left-hand and right-hand cylinder banks 1L and 1R, as shown by the phantom lines in FIG. 1 is possible without being interfered by the presence of the individual intake passages 6a to 6l.

A generally elongated connecting tank 9L is mounted above the left-hand cylinder bank 1L so as to extend generally parallel to the adjacent surge tank 4L in a space delimited between the branch duct 5L and a left-hand group of the intake passages 6a to 6f. As best shown in FIG. 2, this connecting tank 9L is communicated with the intake passages 6a to 6f of the left-hand group through respective short passages 10 each having a respective shutter value 11 pivotally supported therein by means of a common pivot shaft 12 that extends generally over the length of the connecting tank 9L. Similarly, a generally elongated connecting tank 9R is mounted above the right-hand cylinder bank 1R so as to extend generally parallel to the adjacent surge tank 4R in a space delimited between the branch duct 5R and a right-hand group of the intake passages 6g to 6l, and is communicated with the intake passages 6g to 6l through respective short passages 10 each having a respective shutter valve 11 pivotally supported by means of a common pivot shaft 12 which extends generally over the length of the connecting tank 9R. As will be discussed later, those shutter valves 11 serve to adjust or change the number of engine revolutions for the synchronism with an inertia supercharging.

Each of the connecting tanks 9L and 9R is of a design wherein, in order to secure as large a volume as possible without adversely affecting the positioning of the associated branch duct 5L or 5R, a generally intermediate portion of the respective connecting tank 9L or 9R immediately beneath the associated branch duct 5L or 5R is substantially flattened as best shown by the solid line in FIG. 2 while portions thereof on respective sides of the associated branch duct 5L or 5R are generally radially outwardly enlarged so as to assume maximum sectional areas as shown by double-dotted chain lines in FIG. 2. However, front and rear end portions of the respective connecting tank 9L or 9R are again flattened progressively as the distance increases away from the associated branch duct 5L or 5R as shown by single-dotted chain lines in FIG. 2.

Each of the left-hand and right-hand surge tanks 4L and 4R has a choke valve 13 disposed therein at a location substantially intermediate of the length thereof for pivotal movement between opened and closed position with respect to the direction of the crank axis or the longitudinal sense of the engine cylinder block. Each choke valve 13 is operable to adjust or change the number of engine revolution for the synchronization with a resonant supercharging and, when held in the closed position, divides the interior of the associated surge tank 4L or 4R into two chambers. In other words, so long as the respective choke valve 13 is in the opened position, only one chamber is defined within the associated surge tank 4L or 4R.

More specifically, referring to the left-hand surge tanK 4L for the purpose of clarity, the intake passages 6a to 6f are communicated with each other through the single chamber in the surge tank 4L when and so long as the choke valve 13 is in the opened position, but when the choke valve 13 is pivoted to the closed position, the interior of the surge tank 4L is divided into two chambers 4a and 4b (or 4c and 4d), the chamber 4a being communicated with the intake passages 6a to 6c while the chamber 4b is communicated with the intake passages 6d to 6f. On the other hand, the two passages 5g and 5f of the left-hand branch duct 5L open into the interior of the associated surge tank 4L at respective locations each on one side of the choke valve 13 and, therefore, when the choke valve 13 is in the closed position dividing the interior of the surge tank 4L into the chambers 4a and 4b, air to be mixed with fuel which is then flowing through the passages 5g and 5f of the branch duct 5L is supplied into the chambers 4a and 4b.

A similar description made to the left-hand surge tank 4L can equally apply to the right-hand surge tank 4R. Briefly speaking, when and so long as the choke valve 13 in the right-hand surge tank 4R is in the closed position, air to be mixed with fuel which is then flowing through the passages 5g and 5f of the right-hand branch duct 5R is supplied into the chambers 4a and 4b within the right-hand surge tank 4R.

Assuming that the choke valve 13 in each of the left-hand and right-hand surge tanks 4L and 4R is in the closed position, the chambers 4a and 4b in the respective surge tank 4L and 4R are communicated with each other through an associated connecting passage 24 having a choke valve 15 disposed therein at a location substantially intermediate of the length thereof for the adjustment of the number of engine revolution for the synchronization with a resonant supercharging. The respective connecting passage 14 has a length chosen to be smaller than the length of the partition wall 5e formed within the associated branch duct 5L or 5R so as to define the passages 5f and 5g.

It is to be noted that the throttle casing 3 is rigidly mounted on stays 16 which are integrally formed with respective walls of the intake passages 6a, 6b, 6g and 6h. It is also to be noted that reference numeral 17 employed in FIG. 2 represent fuel injection nozzles through which fuel is injected into the associated combustion chambers.

Dynamic effects of intake air brought about by the operation of the valves 11, 13 and 15 will now be discussed. However, for the purpose of a better understanding thereof, the firing sequence of the combustion chambers is assumed such that the combustion chambers communicated respectively with the intake passages 6a to 6c will not be fired immediately one after another; the combustion chambers communicated respectively with the intake passages 6d to 6f will not be fired immediately one after another; the combustion chambers communicated respectively with the intake passages 6g to 6i will not be fired immediately one after another; and the combustion chambers communicated respectively with the intake passages 6j to 6l will not be fired immediately one after another.

(1) When the number of revolutions of the combustion engine is lower than 3,500 rpm, all of the valves 11, 13 and 14 are closed and, therefore, a resonant supercharging takes place with respective portions of the branch ducts 5L and 5R upstream of the associated partition walls 5e being utilized as pressure reversing portions (i.e., a resonant supercharging takes place with the passages 5f and 5g utilized as resonant passages).

(2) When the number of revolutions of the combustion engine is within the range of 3,500 to 4,500 rpm, the valves 11 and 13 are closed and only the valves 15 are opened and, therefore, the resonant supercharging takes place with the connecting passages 14 utilized as resonant passages.

(3) When the number of revolutions of the combustion engine is within the range of 4,500 to 5,500 rpm, only the valves 11 are closed and the valves 13 and 15 are opened. In this condition, an inertia supercharging takes place with the surge tanks 4L and 4R used as pressure reversing portions.

(4) When the number of revolutions of the combustion engine is higher than 5,500 rpm, all of the valves 11, 13 and 15 are opened. In this condition, the inertia supercharging takes place with the connecting tanks 9 being utilized as pressure reversing portions.

In this condition, the intake air sucked externally from a source thereof, for example, the atmosphere is, when entering the throttle casing 3 and then the merging region 5a of the upstream intake manifold 5, divided equally into two equal air components which subsequently flow into the left-hand and right-hand manifold passages 5c and 5d. Each of the air components flowing respectively in the left-hand and right-hand manifold passages 5c and 5d is again divided into equal components within the associated intake duct 5L or 5R by the partition wall 5e extending in a direction generally perpendicular to the crank axis, one flowing through the passage 5g and the other through the passage 5f.

Figure 3:
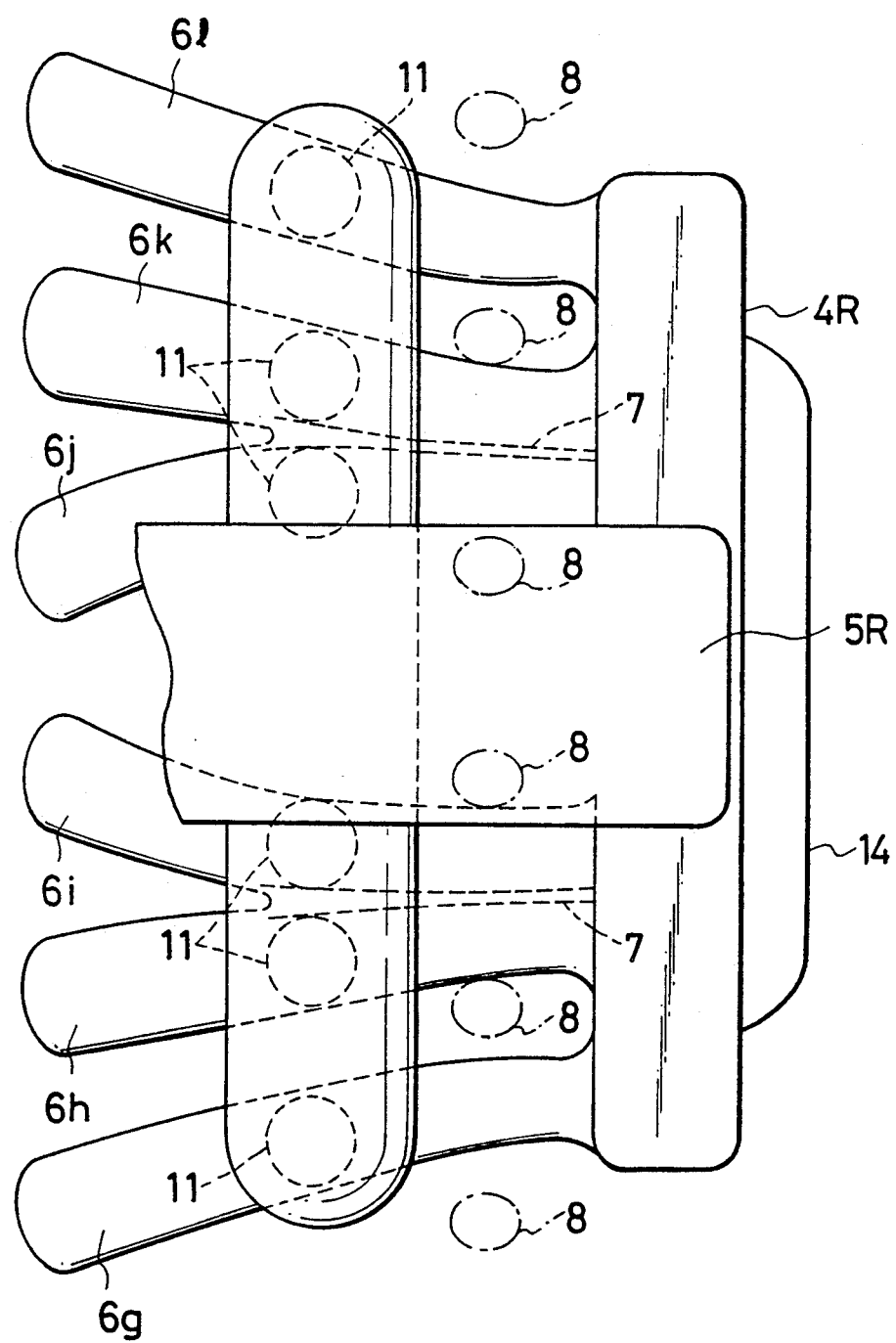
FIG. 3 is a top plan view of a portion of the V-type combustion engine according to a second preferred embodiment of the present invention.

Referring now to FIG. 3, there is shown the fuel intake system according to a second preferred embodiment of the present invention. It is however to be noted that, although FIG. 3 shows only the right-hand bank of the engine cylinder block for the sake of brevity, the left-hand bank of the same engine cylinder block is to be understood as constructed in a fashion similar to the right-hand bank, as illustrated hereinabove.

According to the second preferred embodiment of the present invention, of the intake passages 6g to 6l, the intake passages 6g and 6l which are positioned at outermost of the other intake passages with respect to the direction parallel to the crank axis, i.e., adjacent the front and rear end of the engine cylinder block, are defined in a single suction piping. On the other hand, the intake passages adjacent the right-hand branch duct 5R have their ends adjacent the right-hand surge tank 4R which are defined in a common suction piping.

In other words, according to the embodiment shown in FIG. 3, the respective ends of the intake passages 6h and 6i adjacent the surge tank 4R are defined in a single suction piping having a partition wall 7 formed therein so as to define respective parts of the intake passages 6h and 6i. Similarly, the respective ends of the intake passages 6j and 6k adjacent the surge tank 4R are defined in a single suction piping having a partition wall 7 formed therein so as to define respective parts of the intake passages 6j and 6k.

The design according to the second embodiment shown in FIG. 3 permits the space between each neighboring shutter valves 11 to increase as it approaches each of the opposite ends of the engine cylinder block in a direction generally parallel to the crank axis so that not only is it be possible to employ the intake passages 6g to 6l of equal length, but a convenient servicing of each of the ignition plugs 8 can also be attained.

A third preferred embodiment of the present invention is shown in FIGS. 4 to 9, reference to which will now be made for the detailed discussion thereof. According to the third embodiment of the present invention, the merging region 5a of the upstream intake manifold 5 is positioned within the generally V-shaped longitudinal center space V between the left-hand and right-hand banks 1L and 1R at a location adjacent the rear end of the engine cylinder block (or an upper portion of the drawing of FIG. 4). In addition, unlike the merging region 5a in any one of the first and second embodiments of the present invention as previously discussed, the merging region 5a in the third preferred embodiment of the present invention is comprised by a single passage element with no partition wall (corresponding to the partition wall 5b in the previously discussed embodiments) formed therein. Similarly, the throttle casing 3 employed in the third preferred embodiment of the present invention has only one throttle passage defined therein in communication with the merging region 5a.

Figure 4:
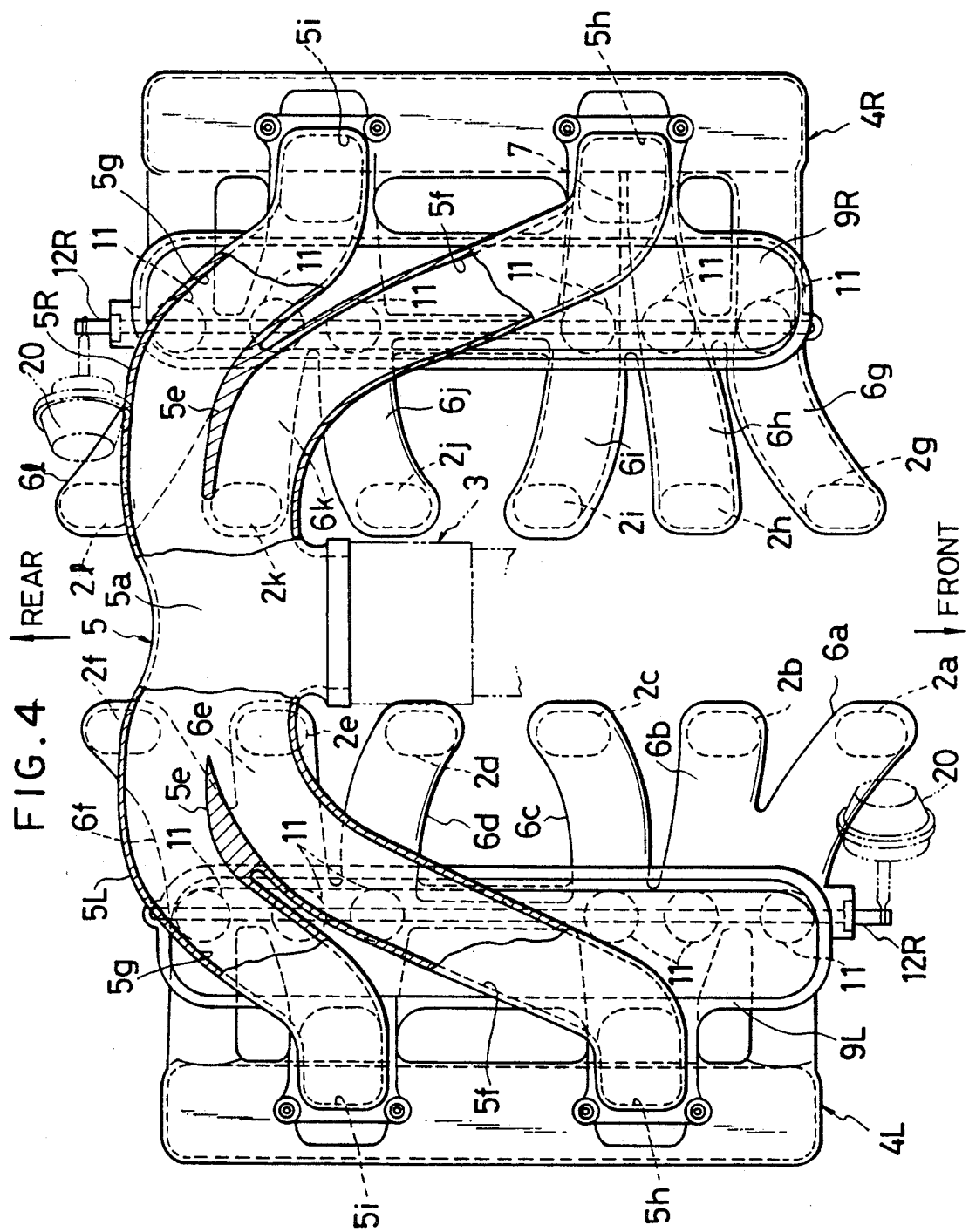
FIG. 4 is a top plan view of the V-type combustion engine according to a third preferred embodiment of the present invention.
Figure 5:
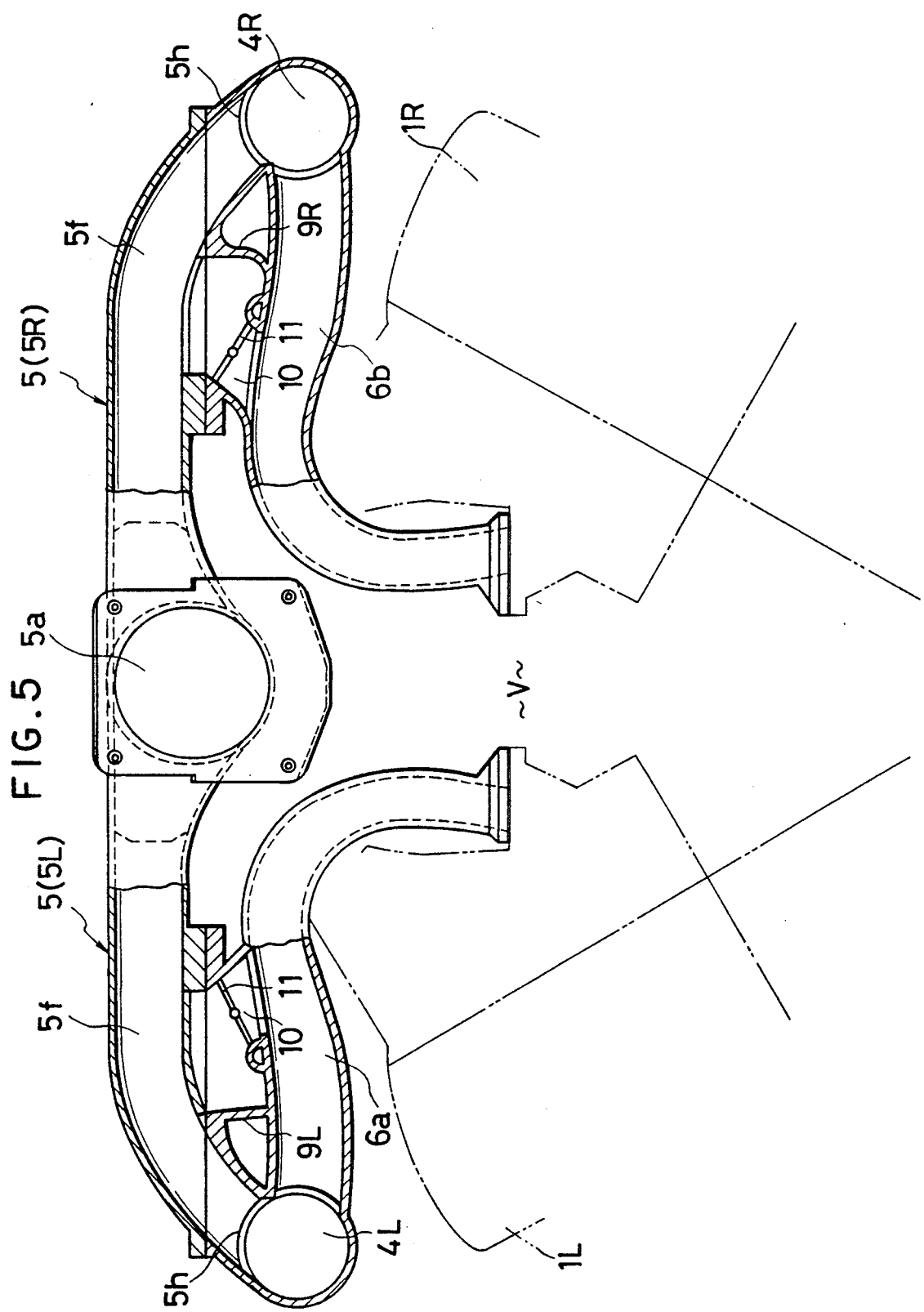
FIG. 5 is a front elevational view, with a portion cut away, of the V-type combustion engine of FIG. 4 as viewed from front of the automotive vehicle.

As best shown in FIG. 4, the upstream intake manifold 5 is of a design wherein, after each of the left-hand and right-hand intake ducts 5L and 5R has extended a short distance straight outwards from the merging region 5a towards the associated surge tank 4L or 4R, the respective intake duct 5L and 5R is branched off to provide front and rear passages 5f and 5g, the front passage 5f being communicated with a front end portion of the associated surge tank 4L or 4R while the rear passage 5g is communicated with a rear end portion of the associated surge tank 4L or 4R. Assuming that each surge tank 4L and 4R is divided into the front and rear end portions of equal length in a direction parallel to the crank axis, the connection 5h between the front intake passage 5f and the front end portion of the associated surge tank 4L or 4R is defined at a point intermediate of the length of the front end portion of the associated surge tank 4L or 4R and the connection 5i between the rear intake passage 5f and the rear end portion of the associated surge tank 4L or 4R is defined at a point intermediate of the length of the rear end portion of the associated surge tank 4L or 4R.

With respect to valves which serve to substantially vary the length of the intake piping, the third embodiment of the present invention employs only the shutter valves 11 and no valves equivalent to the valves 13 and 15 employed in any one of the foregoing embodiments are employed. The shutter valves 11 employed in the third embodiment of the present invention are adapted to be selectively closed and opened by respective actuators which are generally identified by 20 and which are not discussed in the description of any one of the first and second preferred embodiments of the present invention.

The intake passages 6a to 6l associated with the left-hand and right-hand cylinder banks 1L and 1R in the embodiment of FIGS. 4 to 9 are arranged and installed in a manner similar to those discussed in connection with the second preferred embodiment of the present invention with reference to FIG. 3.

FIGS. 6 to 9 illustrate the details of the merging region 5a defined in the upstream intake manifold 5. The illustrated merging region 5a is formed with an exhaust gas recirculating (EGR) passage 21 and a blow-by gas recirculating passage 22 and also with a bypass passage (ISC passage) 23 bypassing the throttle valve 3a within the throttle casing 3.

Figure 6:
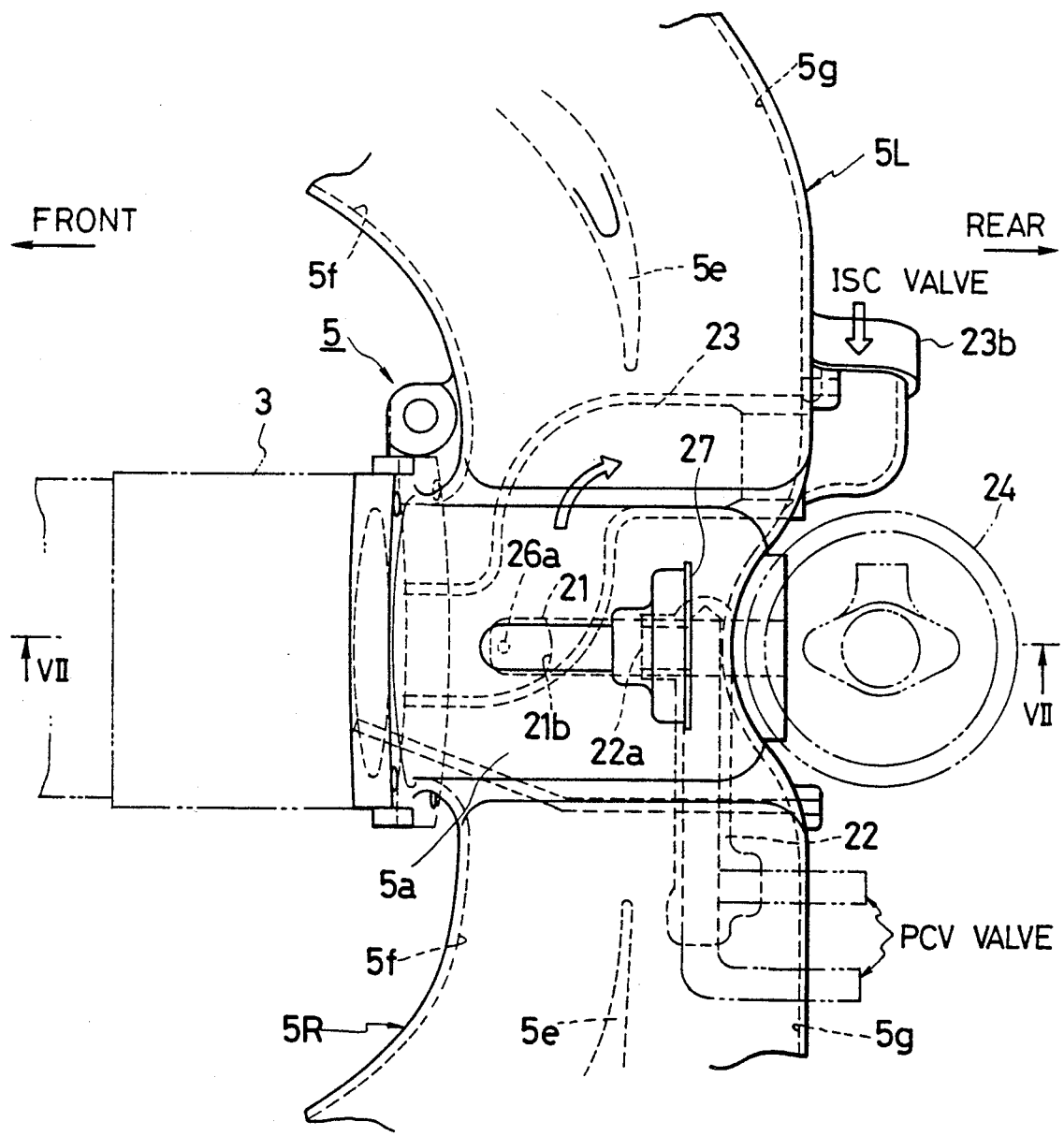
FIG. 6 is an elevational view, on an enlarged scale, showing a merging region of an upstream passage employed in the combustion engine of FIG. 4.
Figure 7:
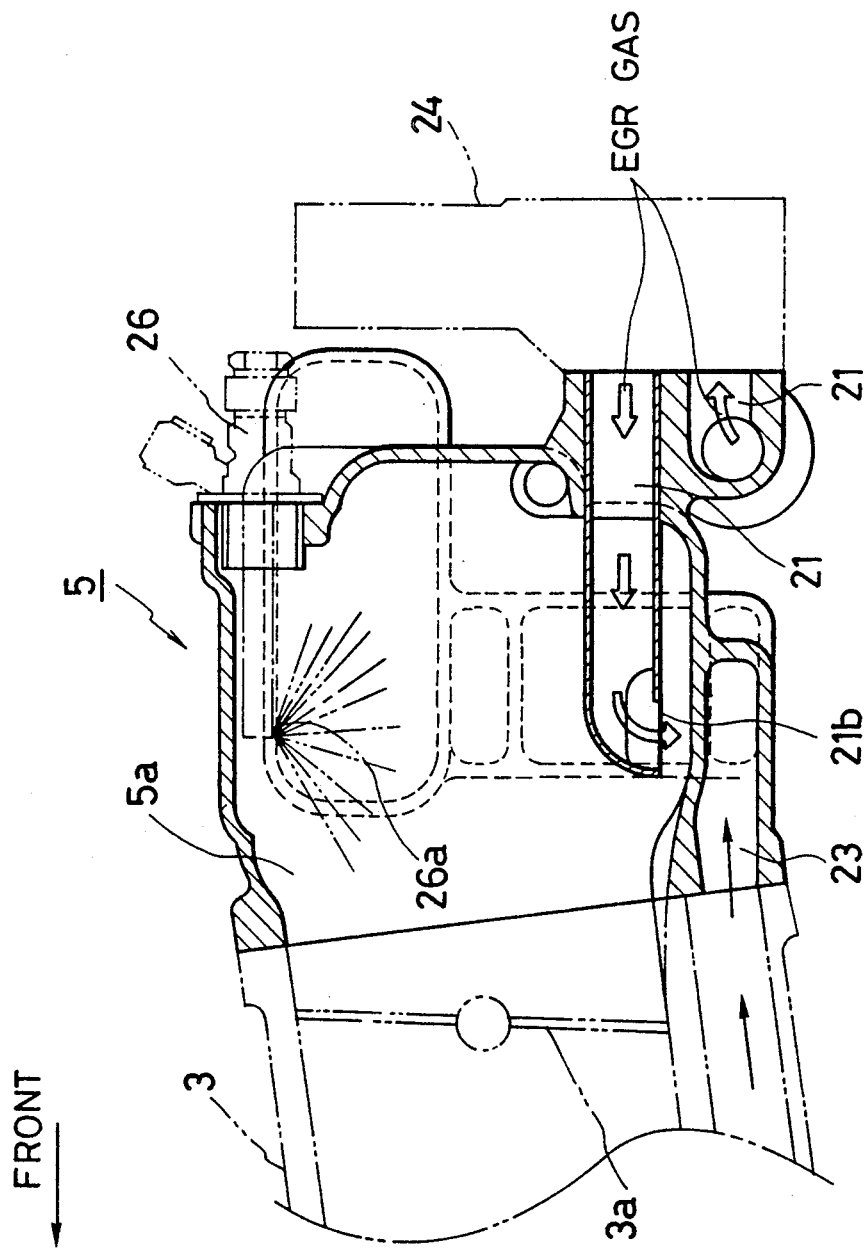
FIG. 7 is a cross-sectional view taken along the line VII—VII in FIG. 6.

The details of the exhaust gas recirculating passage 21 will now be discussed. A rear open end of the merging region 5a is, as best shown in FIGS. 6 and 7, provided with an EGR regulating valve 24 for regulating the quantity of exhaust gases being recirculated from an automobile exhaust system through the exhaust gas recirculating passage 21. For supporting the EGR regulating valve 24, the merging region 5a has a lower end formed with a flanged seat 25 to which the EGR regulating valve 24 is fitted as best shown in FIG. 9. The exhaust gases drawn from the automobile exhaust system are recirculated through an external piping (not shown) and then into a valve casing for the EGR regulating valve 24 through an inlet port 21a, entering the merging region 5a after having travelled past the EGR regulating valve 24. The exhaust gases so recirculated emerge outwardly from the merging region 5a through a discharge port 21b defined at a substantially central area of the merging region 5a.

The blow-by gas recirculating passage 22 has a discharge opening 22a positioned immediately above the discharge port 21b for the recirculated exhaust gases as best shown in FIG. 8.

As best shown in FIG. 9, the bypass or ISC passage 23 extends from the passage within the throttle casing 3 and then through a passage within the merging region 5a to an outlet port 23a defined at a rear portion of the merging region 5a. The outlet port 23a of the bypass passage 23 is in turn communicated with an inlet port 23b, defined at a rear portion of the merging region 5a through an external piping (not shown) so that ISC air can flow from the outlet port 23a and then into the merging region 5a through the inlet port 23b. It is to be noted that, although not shown, the external passage communicating between the outlet port 23a and the inlet port 23b has an ISC value disposed therein for regulating the flow of the ISC air to be subsequently discharged into the merging region 5a.

As best shown in FIG. 7, the merging region 5a has an upper portion formed with a fitting seat 27 to which a cold injector 26 is fitted.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. A fuel intake system for a combustion engine of a type having generally V-shaped first and second cylinder banks, said combustion engine having a crank axis along which a crankshaft extends, comprising:
a throttle casing disposed in a center space delimited between the first and second cylinder banks;
generally elongated first and second surge tanks extending in a direction generally parallel to the crank axis and disposed on respective sides of the center space;
a passage means communicating the throttle casing to each of the first and second surge tanks; and
said passage means comprising a merging region communicated with the throttle casing; and
first and second branch ducts branched off from one end of the merging region opposite to the throttle casing, said first and second branch ducts leading to the first and second surge tanks, respectively, each of said first and second branch ducts being comprised of two independent passages spaced apart from each other in a direction parallel to the crank axis, said two independent passages of each of the first and second branch ducts being communicated with different portions of the associated surge tank which are uniformly spaced from each other in a direction parallel to the crank axis.

2. A fuel intake system for the combustion engine as claimed in claim 1, wherein each of the first and second cylinder banks has a plurality of combustion cylinders defined therein and spaced apart from each other in a direction generally parallel to the crank axis, the combustion cylinders in the first cylinder bank being communicated with the first surge tank through first connecting passages while the combustion cylinders in the second cylinder bank are communicated with the second surge tank through second connecting passages.

3. A fuel intake system for the combustion engine as claimed in claim 1, wherein said different portions of each of the first and second surge tanks are defined at respective positions generally intermediate of the length of the associated surge tank which extends generally parallel to the crank axis.

4. A fuel intake system for the combustion engine as claimed in claim 1, wherein each of said different portions of each of the first and second surge tanks is defined at a position intermediate the length of one of approximately equal halves of the associated surge tank with respect to the direction parallel to the crank axis.

5. A fuel intake system for the combustion engine as claimed in claim 1, wherein said throttle casing has defined therein a pair of throttle passages extending in a direction generally parallel to the crank axis and associated respectively with the first and second cylinder banks, and wherein said merging region has a hollow thereof divided by a partition wall into two passage segments through which the throttle passages are communicated respectively with the first and second branch ducts.

6. A fuel intake system for the combustion engine as claimed in claim 1, wherein said throttle casing has a single passage extending in a direction generally parallel to the crank axis, and wherein said merging region serves as a common passage from which the first and second branch ducts are branched off.

7. A fuel intake system for the combustion engine as claimed in claim 2, wherein a first opening/closing valve for dynamic suction effect is disposed for each of the first and second cylinder banks within the center space between the surge tanks and at a position generally intermediate thereof with respect to the direction parallel to the crank axis, said first opening/closing valve being operable to permit a single chamber to be defined within the associated surge tank when opened, but operable to permit two chambers to be defined within the associated surge tank when closed, said two chambers being communicated with groups of combustion cylinders which are spaced from each other in terms of a firing sequence.

8. A fuel intake system for the combustion engine as claimed in claim 7, wherein a first fluid-connecting means is provided in each of the first and second surge tanks for fluid-connecting the two chambers together, and a second opening/closing valve is disposed within the first fluid-connecting means at a location generally intermediate of the length of the first fluid-connecting means.

9. A fuel intake system for the combustion engine as claimed in claim 2, wherein generally elongated first and second connecting tanks are disposed in the vicinity of the first and second connecting passages, each of said first and second connecting tank extending in a direction generally parallel to the crank axis, said first connecting passages and the first connecting tank being communicated with each other through a second connecting passage means while said second connecting passages and the second connecting tank are communicated with each other through a second connecting passage means, each of said second connecting passage means having a shutter valve disposed therein for selectively opening and closing the associated second passage means.

10. A fuel intake system for the combustion engine as claimed in claim 9, wherein the shutter valves disposed in the second passage means associated with the first cylinder bank are supported on a common operating shaft and the the shutter valves disposed in the second passage means associated with the second cylinder bank are supported on a common operating shaft.

11. A fuel intake system for the combustion engine as claimed in claim 9, wherein the first branch duct and the first intake passages are positioned one above the other with the first branch duct occupying a position upwardly of the first intake passages and the first connecting tank is positioned generally intermediate between the first branch duct and the first intake passages, and wherein the second branch duct and the second intake passages are positioned one above the other with the second branch duct occupying a position upwardly of the second intake passages and the second connecting tank is positioned generally intermediate between the second branch duct and the second intake passages.

12. A fuel intake system for the combustion engine as claimed in claim 11, wherein a portion of each of the first and second connecting tanks which is positioned immediately beneath the associated branch duct has a wall of a thickness smaller than that of the remaining portion thereof.

13. A fuel intake system for the combustion engine as claimed in claim 2, wherein a suction piping means forming each of the first and second intake passages comprises independent suction pipings and a common suction piping having a partition wall dividing a hollow of the common suction piping into two adjoining independent suction passages, said independent suction pipings and said common suction piping defining an access gap for the access to ignition plugs during servicing thereof.

14. A fuel intake system for the combustion engine as claimed in claim 13, wherein all of the first and second intake passages associated with the first and second cylinder banks, respectively, have a substantially equal length.

15. A fuel intake system for the combustion engine as claimed in claim 1, wherein the combustion engine is mounted on an automotive body structure with its crank axis aligned with a longitudinal sense of the automotive body structure.

16. A fuel intake system for the combustion engine as claimed in claim 15, wherein the throttle casing is mounted on the combustion engine at a position between the first and second cylinder banks and adjacent a front end thereof with respect to the longitudinal sense of the automotive body structure.

17. A fuel intake system for the combustion engine as claimed in claim 16, wherein the merging region extends from the throttle casing in a direction towards a rear end of the combustion engine, and wherein each of said first and second branch ducts extends in a direction generally transverse of the crank axis and the different portions of each of the first and second surge tanks are located at a position intermediate of the length of the associated surge tank and spaced apart from each other in a direction parallel to the crank axis.

18. A fuel intake system for the combustion engine as claimed in claim 17, wherein each of the first and second branch ducts has a partition wall extending in a direction generally perpendicular to the crank axis and also extending from the associated surge tank so as to terminate in the vicinity of and spaced a slight distance inwardly from the merging regions, said partition wall dividing a portion of an interior of the associated branch duct into two independent passages.

19. A fuel intake system for the combustion engine as claimed in claim 17, wherein the different portions are defined on an upper wall of each of the first and second surge tanks.

20. A fuel intake system for the combustion engine as claimed in claim 15, wherein the merging region is disposed between the first and second cylinder banks at a position adjacent a rear end of the combustion engine and the throttle casing is disposed frontwardly of the merging region.

21. A fuel intake system for the combustion engine as claimed in claim 20, wherein each of said different portions of each of the first and second surge tanks is defined at a position intermediate the length of one of equal halves of the associated surge tank with respect to the direction parallel to the crank axis.

22. A fuel intake system for the combustion chamber as claimed in claim 21, wherein the different portion are defined on an upper wall of each of the first and second surge tanks.

23. A fuel intake system for the combustion chamber as claimed in claim 1, wherein the combustion engine is a 12-cylinder combustion engine with six combustion cylinders defined in each of the first and second cylinder banks in a in-line fashion.

* * * * *